United States Patent [19]
Troemel et al.

[11] 3,844,566
[45] Oct. 29, 1974

[54] TRANSCRIBING DEVICE

[75] Inventors: Richard J. Troemel, North Prairie; Joseph James Zimmermann, Elm Grove, both of Wis.

[73] Assignee: GTE Automatic Electric Laboratories Incorporated, Northlake, Ill.

[22] Filed: Dec. 20, 1971

[21] Appl. No.: 209,545

[52] U.S. Cl. .............. 274/9 R, 274/15 R, 274/39 A
[51] Int. Cl. ....................... G11b 17/06, G11b 25/04
[58] Field of Search ..... 274/1 A, 15 R, 37, 1, 39 A, 274/1 E, 9 R; 353/19

[56] References Cited

UNITED STATES PATENTS

| | | | |
|---|---|---|---|
| 2,577,149 | 12/1951 | Pelton | 274/37 |
| 3,030,114 | 4/1962 | Jauquet | 274/15 R |
| 3,401,942 | 9/1968 | Strauss | 274/1 A |
| 3,403,067 | 9/1968 | Aneggar | 274/15 R |
| 3,411,790 | 11/1968 | Sachowski | 274/1.1 |
| 3,480,356 | 11/1966 | Dimitracopoulos | 353/19 |
| 3,589,735 | 6/1971 | Watanabe | 274/1 A |

FOREIGN PATENTS OR APPLICATIONS

| | | | |
|---|---|---|---|
| 1,814,789 | 8/1969 | Germany | 274/1 A |

*Primary Examiner*—Louis R. Prince
*Assistant Examiner*—A. J. Mirabito
*Attorney, Agent, or Firm*—David W. Heid

[57] ABSTRACT

A transcribing device is disclosed which includes a turntable adapted to support a magnetic recording medium having a spiral groove, the turntable being movable away from a tone arm which is supported for arcuate movement in a plane above the surface of the turntable. The tone arm supports a magnetic recording and reproducing head having a pole face which normally engages the spiral groove in the magnetic recording medium. The magnetic head is normally positioned in the lead-in groove of the disc and upon rotation of the turntable follows the groove across the face of the recording medium. At the end of the recorded message, energization of an electromagnet pivots the turntable assembly away from the magnetic head, disengaging the pole face from the groove, and the tone arm is returned to its normal position by a biasing spring.

9 Claims, 2 Drawing Figures

PATENTED OCT 29 1974 3,844,566

INVENTORS
RICHARD J. TROEMEL
JOSEPH JAMES ZIMMERMANN
BY
David W. Heid
ATTORNEY

TRANSCRIBING DEVICE

BACKGROUND OF THE INVENTION

1. Field of the Invention

This invention relates generally to transcribing devices employing a recording medium having a spiral groove in which a transducing device travels to record and/or play back information.

2. Description of the Prior Art

In some prior art arrangements the play back of a recorded disc is accomplished by lifting the transducer from a rest position remote from the recording medium, moving it over the recording medium and then lowering the transducer into the groove. The recording medium is then rotated and the transducing device plays back the recorded information. At the end of the recording, the transducer is lifted from the groove and returned to its rest position. In this type of arrangement it is of course necessary to move the tone arm upward and position it to the predetermined point above the lead-in groove then lower the arm into the groove and at the end of the recording lift the tone arm and return it to the rest position, this movement and positioning requiring relatively complicated mechanical arrangements.

SUMMARY OF THE INVENTION

The present invention provides a transcribing device which eliminates the complicated positioning mechanisms associated with prior art recording and play back arrangements. In the present invention a tone arm, having a transducing device attached thereto, is biased toward one edge of a recording medium, and moves only in a plane substantially parallel to the recording medium. In its normal position, the transducing device is positioned in the lead-in groove of the spirally grooved recording medium and upon an appropriate signal the turntable drive motor rotates the turntable and the transducer device follows the spiral groove across the recording medium to play back or record information. After completing the recording or play back, the turntable is moved away from the tone arm and the tone arm is returned to the edge of the recording medium above the lead-in groove by a biasing arrangement. The turntable is then returned to its original position and the transducing device is again positioned in the lead-in groove of the recording medium.

One of the objects of the present invention is to provide an inexpensive transcribing device which eliminates the complicated raising and lowering mechanism associated with tone arms in the prior art transcribers.

Another object of the present invention is to provide a simplified transcribing device suitable for use with a pregrooved magnetic disc.

These and other objects of the present invention will become readily apparent upon perusal of the detailed description of the present invention.

DESCRIPTION OF THE PREFERRED EMBODIMENT

Figure 1:
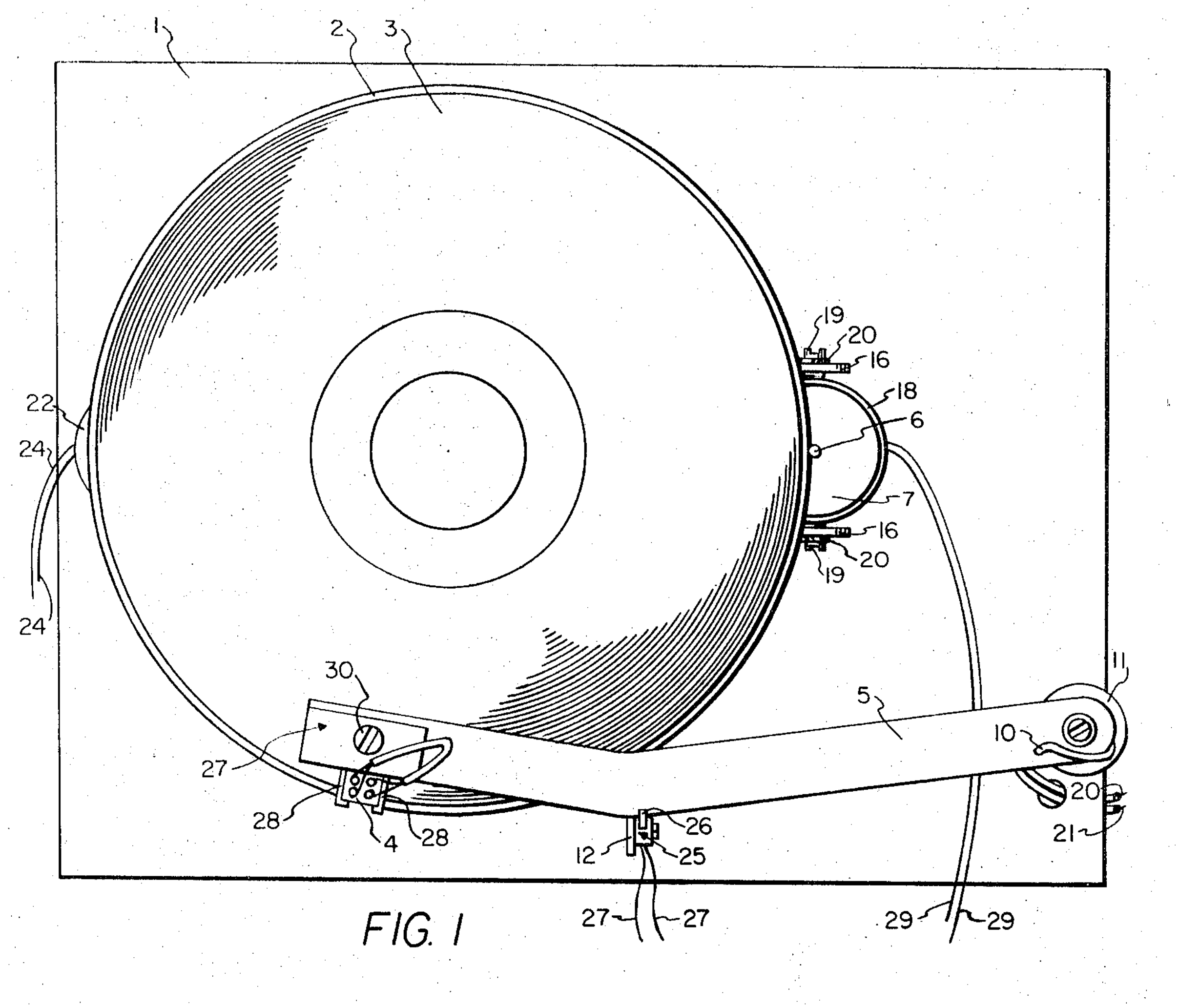
FIG. 1 is a top view of the transcribing device of the present invention, with the tone arm positioning the transducing head in the lead-in groove of the magnetic disc recording medium.

As shown in FIG. 1, the various components of the transcribing device are mounted on a supporting base 1. These components include a turntable 2 which supports and positions the magnetic recording medium 3 in operative relationship with transducing device 4 positioned above the magnetic recording medium 3 by tone arm 5. Transducing device 4 is attached to tone arm 5 by an L shaped bracket 27, having arms 28 on one leg for gripping transducing device 4, the other leg of the L being attached to tone arm 5 by a mounting screw 30. Turntable 2 is driven directly by shaft 6 of electric motor 7, the edge of the turntable being frictionally engaged with the drive shaft 6.

Figure 2:
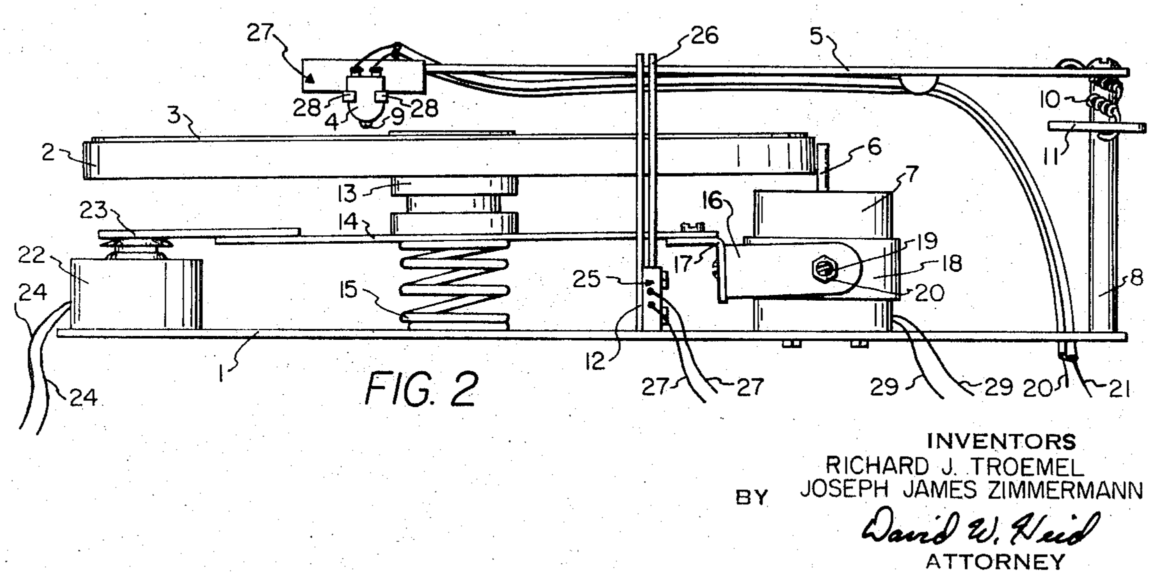
FIG. 2 is a front view of the transducing apparatus of the present invention showing the turntable assembly pivoted away from the tone arm.

As can best be seen from FIG. 2, tone arm 5 is pivoted for arcuate movement about the top of tone arm support post 8, the tone arm being movable in a plane substantially parallel to the surface of turntable 2 when turntable 2 is in the playing position. This parallel relationship is not present in FIG. 2 since the turntable assembly has been pivoted away from the transducer 4 to disengage the transducer pole face 9 from the groove in recording medium 3. Pole face 9 is advantageously designed to be of a width which will fit within the groove of recording medium 3 and when engaged therewith cause the transducer 4 and hence tone arm 5 to follow in the groove upon rotation of turntable 2. Transducing device 4 is vertically movable within arms 28 to affect a deeper or shallower engagement of pole face 9 with the groove in recording medium 3. The engagement determines the pole face 9 to groove pressure for optimum record and playback performance and/or minimum wear of pole face 9 and recording medium 3. Helical spring 10 has one end thereof attached to a projection 11 of tone arm support post 8, is wound about post 8, and has the other end attached to tone arm 5. As can be seen from FIG. 2, the direction of winding of spring 10 around post 8 provides to tone arm 5 a bias which tends to move tone arm 5 toward the outer edge of turntable 2. Tone arm stop member 12, which is rigidly affixed to support base 1, is advantageously positioned such that when the turntable 2 is lowered and pole face 9 is disengaged from the grooves of magnetic recording medium 3, any rotation of tone arm 5 under the bias from the helical spring 10 will be stopped by member 12 so that pole face 9 will be positioned directly above the lead-in groove of magnetic recording medium 3. The bias provided by spring 10 is only sufficient to return tone arm 5 to stop member 12 after pole face 9 has been disengaged from the grooves of recording medium 3.

As can best be observed in FIG. 2, the turntable 2 is supported in operative relationship with the transducing device 4 and the drive shaft 6 by an assembly which includes a compression bearing arrangement 13 which is affixed to turntable support member 14. Support member 14 is urged upward from supporting base 1 by helical spring 15, the upward travel of the turntable assembly being limited by drive shaft 6. During the cycle of operation of the transcribing device it is necessary to move the turntable 2, and hence the recording medium 3, away from the transducing device 4 in order to disengage the pole face 9 from the grooves of the recording medium and thus allow the tone arm 5 to be returned to the outer edge of the turntable. In the present invention the turntable support member 14 is affixed to a generally U-shaped member 16 by an angle bracket 17, and the U-shaped member 16 is then pivoted about sleeve 18 which is affixed to electric motor 7. A pair of screws 19 are threaded through U-shaped member 16, and have somewhat pointed ends which contact sleeve 18 to support the U-shaped member and thus ultimately the turntable 2 in a pivotal arrangement about sleeve 18.

Lock nuts 20 are advantageously used to secure the screws 19 in a fixed position once they have been tightened into opposing indentations of sleeves 18. With this support arrangement it can be seen that the turntable 2 will normally be forced upward by helical spring 15 such that the groove in the recording medium 3 is engaged with the pole face 9 and the edge of turntable 2 is pressed against the drive shaft 6 of electric motor 7, this being the position illustrated by FIG. 1. Under these conditions, as illustrated in FIG. 1, the pole face 9 will be resting in the lead-in groove of recording medium 3 and the transcribing device will be ready to begin its cycle of operation. If one now connects a supply voltage, not shown, to the supply leads 29 of electric motor 7, electric motor 7 will begin rotating turntable 2 and the transducer 4 will travel in the groove of magnetic recording medium 3 across the face of the medium, and through transducer leads 20 and 21 information may be recorded or played back from recording medium 3. Assuming that the electric motor 7 has been energized and the transducer 4 has moved partially across the face of recording medium 3, it may now be desirable to stop the rotation of the turntable 2 and return the tone arm 5 to its normal position near the edge of turntable 2. This may be accomplished by merely moving turntable 2 away from the transducer 4. Upon disengagement of pole face 9 from the groove in recording medium 3, tone arm 5 and hence transducer 4 move to the normal rest position under the control of helical spring 10, the travel of tone arm 5 being in a plane generally parallel with the surface of turntable 2. In this embodiment of the present invention the lowering of the turntable 2 is accomplished by means of an electromagnet 22 which attracts high permeability strip 23, which is rigidly affixed to turntable support member 14. Turntable 2 pivots away from the transducer 4 and tone arm 5 is moved to its original rest position by helical spring 10, this being the position illustrated in FIG. 2. As can further be seen from FIG. 2, after turntable 2 has been pivoted downward under the control of electromagnet 22 the edge of turntable 2 is no longer in contact with drive shaft 6 and thus the driving force to turntable 2 is removed.

The transcribing device of the present invention is well suited to giving out a prerecorded message in response to some activating signal. For example one might desire to have a display case and give a message to a viewer upon the activation of a pushbutton located adjacent to this case. In such a situation, the desired message would first be recorded on the magnetic medium 3, and at the end of the message record a predetermined tone which would signal associated circuitry to end the cycle of operation. By supplying the signal from the transducer 4 to a frequency selective circuit which would respond only to this tone, and in response thereto supply operating potential to leads 24 of electromagnet 22 to lower the turntable 2, tone arm 5 would return to its rest position thereby ending the cycle of operation under an arrangement to be explained subsequently. Assuming that we have the message and an end-of-message tone recorded on the recording medium 3, then the electromagnet 22 would be energized and the tone arm 5 returned to the rest position at the end of the message. If the motor energizing circuit includes a momentary closing switch to start motor 7, then it will be necessary to provide an additional source of operating potential for electric motor 7 once the pushbutton has been released by the operator. In the present invention this is accomplished by providing a second path for operating potential through switch 25, having an actuator arm 26 which contacts the tone arm 5 at its outer edge. The actuator arm 26 is positioned such that once the tone arm 5 moves a short distance inward under the control of the record groove, operating potential is supplied to motor 7 through leads 27 of switch 25. Thus it can be seen that by utilizing switch 25 in a potential supply circuit to electric motor 7, although the supply potential which was derived from a momentary closing of the pushbutton by the operator may no longer be available, upon movement of the tone arm 5 inward of the record groove the resultant closure of switch 25 provides a second path of operating potential to continue the operation of electric motor 7 which will drive the turntable and advance transducer 4 across the record surface giving the prerecorded message to the listener. Once the transducer 4 reaches the prerecorded end-of-message tone, suitable circuitry not shown, will close the energizing circuit to electromagnet 22, thus lowering the turntable and allowing the tone arm 5 to return to its rest position, which upon contact with actuator arm 26 opens switch 25 and stops the operation of the electric motor. Electromagnet 22 need only be energized long enough to allow the tone arm 5 to return to the rest position and open the energizing circuit through switch 25 to electric motor 7, thus stopping the cycle of operation. After the electromagnet 22 is deenergized the turntable 2 will be moved upward under the control of spring 15 and pole face 9 will again engage the lead-in groove of recording medium 3 and the edge of turntable 2 will again be pressed against motor shaft 6. The transcribing device is now in condition for another cycle of operation.

An alternative method of returning tone arm 5 to its original or rest position at the end of the message would involve merely adding an additional switch similar to switch 25 and positioning it such that at the completion of the message its extension arm corresponding to actuator arm 26 would be contacted by tone arm 5 to close a circuit and energize electromagnet 22. The remaining portion of the cycle of operation would be as described previously since after turntable 2 has been lowered, tone arm 5 would return to its rest position and switch 25 would open the operating potential to the motor circuit thus completing the cycle of operation.

The transcribing device of the present invention is also well suited for use in an automatic telephone answering arrangement. Well known ring detection circuitry could be employed to begin the operation of electric motor 7 to transmit a prerecorded message to the caller. As pointed out previously either a predetermined tone could be recorded at the end of the message and circuitry responsive thereto used to actuate solenoid 22 to reset the mechanism for a second cycle of operation, or an extension arm arrangement which would mechanically close a switch at the end of the message upon the control of tone arm 5 to actuate solenoid 22 to return tone arm 5 to its original position.

Although the preferred embodiment has been described using a magnetic recording medium 3 with an appropriate transducing device 4 to record or play back information therefrom, it will be appreciated that the principles of the invention may be practiced by using any form of recording medium having a spiral groove and an appropriate transducer which will travel in the groove.

We claim:

1. In a transcribing device having support means, a recording medium having a spiral groove therein, a turntable assembly mounted on said support means, said turntable assembly including a turntable adapted to receive and support said recording medium, turntable drive means, an arm mounted on said support for arcuate movement in a plane over the surface of said turntable, said arm including means for engaging said groove, means for biasing said arm for arcuate movement in a first direction, said means on said arm engaging said groove to move said arm in an arcuate direction, opposite said first direction, in response to said drive means rotating said turntable, the improvement comprising: an electromagnet mounted on said support means, adjacent to said turntable assembly, whereby upon energization of said electromagnet said turntable assembly is moved away from said arm thereby disengaging said groove engaging means from said groove and allowing said arm to move in said first direction.

2. The transcribing device of claim 1 further including means for establishing the depth of engagement of said groove engaging means into said groove.

3. The transcribing device of claim 1 further including means for stopping the movement of said arm in said first direction whereby said arm is located in a predetermined position within said plane of arcuate movement.

4. A transcribing device of claim 1 wherein said turntable assembly is pivotally mounted on said support.

5. The device of claim 1 further including means for maintaining said assembly in a plane substantially parallel to the plane defined by arcuate movement of said arm and maintaining said groove engaging means on said arm in engagement with said groove.

6. The device of claim 1 wherein said recording medium comprises a magnetic disc and said arm includes a magnetic transducer for recording and reproducing information on said disc.

7. A transcribing device comprising in combination, a support means, turntable drive means mounted on said support means and having a drive shaft extending from one end thereof, a turntable assembly pivotally mounted on said drive means, said turntable assembly including a turntable rotatably supported thereon and adapted to receive and support a recording medium having a spiral groove therein, an arm mounted on said support means for arcuate movement in a plane over the surface of said turntable, said arm including means for engaging the groove in the recording medium, means for biasing said arm for arcuate movement in a first direction, means interposed between said support means and said turntable assembly for normally urging said turntable assembly toward said arm, said groove engaging means into said groove and said turntable into engagement with said drive shaft, and means for moving said turntable assembly away from said arm whereby said groove engaging means is released from the groove in said recording medium and said turntable is moved out of contact with said drive shaft.

8. The transcribing device as claimed in claim 7 wherein said means for moving said turntable assembly away from said arm comprises an electromagnet mounted on said support means, adjacent to said assembly, whereby upon energization of said electromagnet said turntable assembly is pivoted away from said arm thereby disengaging said groove engaging means from said groove and allowing said arm to move in said first direction.

9. The transcribing device as claimed in claim 7 further including means for stopping the movement of said arm in said first direction whereby said arm is located in a predetermined position within said plane of arcuate movement.

* * * * *